(12) United States Patent
Allen et al.

(10) Patent No.: US 12,334,239 B2
(45) Date of Patent: Jun. 17, 2025

(54) PATTERNED MAGNETIC CORES

(71) Applicant: The Trustees of the University of Pennsylvania, Philadelphia, PA (US)

(72) Inventors: Mark George Allen, Philadelphia, PA (US); Min Soo Kim, Philadelphia, PA (US)

(73) Assignee: THE TRUSTEES OF THE UNIVERSITY OF PENNSYLVANIA, Philadelphia, PA (US)

( * ) Notice: Subject to any disclaimer, the term of this patent is extended or adjusted under 35 U.S.C. 154(b) by 982 days.

(21) Appl. No.: 17/288,462

(22) PCT Filed: Oct. 28, 2019

(86) PCT No.: PCT/US2019/058288
§ 371 (c)(1),
(2) Date: Apr. 23, 2021

(87) PCT Pub. No.: WO2020/087062
PCT Pub. Date: Apr. 30, 2020

(65) Prior Publication Data
US 2021/0383958 A1    Dec. 9, 2021

Related U.S. Application Data

(60) Provisional application No. 62/751,242, filed on Oct. 26, 2018.

(51) Int. Cl.
*H01F 27/24*    (2006.01)
*H01F 27/28*    (2006.01)

(52) U.S. Cl.
CPC ............. *H01F 27/24* (2013.01); *H01F 27/28* (2013.01)

(58) Field of Classification Search
CPC ................................ H01F 27/24; H01F 27/28
See application file for complete search history.

(56) References Cited

U.S. PATENT DOCUMENTS

| 5,334,292 A | 8/1994 | Rajeshwar et al. |
| 5,435,903 A | 7/1995 | Oda et al. |
| 6,465,053 B1 | 10/2002 | Lenssen et al. |

(Continued)

FOREIGN PATENT DOCUMENTS

| CN | 1506399 A | 6/2004 |
| CN | 1514451 A | 1/2005 |

(Continued)

OTHER PUBLICATIONS

Result of Consultation European Patent Application Serial No. 17803599.4 (Mar. 20, 2024).

(Continued)

*Primary Examiner* — Malcolm Barnes
(74) *Attorney, Agent, or Firm* — Jenkins, Taylor & Hunt, P.A.

(57) ABSTRACT

In some examples, a patterned magnetic core includes a first sub-score and at least one second sub-core. The first and second sub-cores are spaced apart by a gap, optionally filled with material of sufficiently low electrical conductivity. Each of the first and second sub-scores includes a number of magnetic layers and a number of interlamination layers disposed between the magnetic layers in an alternating fashion.

9 Claims, 7 Drawing Sheets

(56) References Cited

U.S. PATENT DOCUMENTS

| | | | |
|---|---|---|---|
| 6,683,522 B2* | 1/2004 | Walsh | H01F 17/0006 336/174 |
| 7,140,092 B2 | 11/2006 | Park et al. | |
| 8,466,766 B2* | 6/2013 | Carsten | H01F 3/14 336/213 |
| 12,020,861 B2 | 6/2024 | Allen et al. | |
| 2002/0145416 A1 | 10/2002 | Attarian et al. | |
| 2004/0164839 A1* | 8/2004 | Park | H01L 27/08 336/234 |
| 2005/0001707 A1 | 4/2005 | Elliott et al. | |
| 2005/0083155 A1 | 4/2005 | Attarian et al. | |
| 2005/0105225 A1 | 5/2005 | Ahn et al. | |
| 2005/0233593 A1 | 10/2005 | Brunet et al. | |
| 2006/0192646 A1* | 8/2006 | Hanley | H01F 17/06 336/200 |
| 2010/0239794 A1 | 9/2010 | Andrews et al. | |
| 2010/0254168 A1 | 10/2010 | Chandrasekaran | |
| 2013/0002392 A1 | 1/2013 | Parashar et al. | |
| 2013/0224887 A1* | 8/2013 | Lee | C23C 28/34 257/E43.006 |
| 2013/0229841 A1 | 9/2013 | Giuliano | |
| 2014/0061853 A1 | 3/2014 | Webb | |
| 2014/0062646 A1* | 3/2014 | Morrissey | H01F 27/24 257/421 |
| 2015/0200231 A1* | 7/2015 | Herget | H10B 61/00 257/421 |
| 2015/0332825 A1 | 11/2015 | Tera et al. | |
| 2015/0357300 A1 | 12/2015 | Saito et al. | |
| 2015/0371756 A1 | 12/2015 | Sturcken et al. | |
| 2016/0005530 A1* | 1/2016 | Kubik | H01F 17/0033 336/182 |
| 2017/0169929 A1 | 6/2017 | Kubik | |
| 2017/0169944 A1 | 6/2017 | Koo | |
| 2018/0286582 A1* | 10/2018 | Deligianni | H01F 41/046 |
| 2018/0308921 A1* | 10/2018 | Deligianni | H01F 41/041 |
| 2018/0323158 A1* | 11/2018 | Deligianni | H01L 23/645 |
| 2019/0252116 A1* | 8/2019 | Deligianni | H01F 17/0013 |
| 2020/0168374 A1* | 5/2020 | Deligianni | H01F 41/0233 |
| 2020/0335275 A1 | 10/2020 | Allen et al. | |

FOREIGN PATENT DOCUMENTS

| | | |
|---|---|---|
| CN | 103681633 A | 3/2014 |
| CN | 104064318 A | 9/2014 |
| CN | 204425811 U | 6/2015 |
| CN | 105074893 A | 11/2015 |
| CN | 106876111 A | 6/2017 |
| EP | 1 576 205 B1 | 1/2009 |
| EP | 3455864 A1 | 3/2019 |
| EP | 3455864 B1 | 10/2024 |
| GB | 1515565 A | 6/1978 |
| JP | H03227505 A * | 10/1991 |
| WO | WO-87/04559 | 7/1987 |
| WO | WO 00/44006 | 7/2000 |
| WO | WO-2017/205644 A1 | 11/2017 |

OTHER PUBLICATIONS

Notice of Allowance/AFCP 2.0 Decision/Examiner-Initiated Interview Summary for U.S. Appl. No. 16/304,115 (Feb. 22, 2024).
Final Office Action for U.S. Appl. No. 16/304,115 (Dec. 16, 2022).
Summons to attend Oral Proceedings for EP 17803599,4 dated Nov. 3, 2023.
Notice of Intent to Grant for European Patent Application Serial No. 17803599.4 (May 14, 2024).
Communication of European publication number and information on the application of Article 67(3) EPC for European Patent Application Serial No. 19875717.1 (Aug. 4, 2021).
Communication of the Extended European Search Report for European Patent Application Serial No. 17803599.4 (Dec. 19, 2019).
Notification of the First Office Action for Chinese Patent Application Serial No. 201780041759.6 (Dec. 18, 2020).
Commonly-Assigned, Co-pending U.S. Appl. No. 16/304,115 for "Laminated Magnetic Cores," (Unpublished, filed Nov. 21, 2018).
Notification of Transmittal of the International Search Report and the Written Opinion of the International Searching Authority, or the Declaration for International Application No. PCT/US2017/034511 (Aug. 14, 2017).
Anthony et al., "MEMS based on electrochemical process for fabrication of laminated micro-inducers on silicon," Microelectronic Engineering, vol. 155, pp. 33-38 (2016).
Kim et al., "Microfabrication of toroidal inductors integrated with nanolaminated ferromagnetic metallic cores," J. Micromech. Microeng., vol. 23, pp. 1-9 (2013).
Kim et al., "Nanolaminated Permalloy Core for High-Flux, High-Frequency Ultracompact Power Conversion," IEEE Transactions on Power Electronics, vol. 28, No. 9, pp. 1-8 (Sep. 2013).
Kim et al., "A MEMS lamination technology based on sequential multilayer electrodeposition," J. Micromech. Microeng., vol. 23, pp. 1-10 (2013).
Bazzaoui et al., "Sweet aqueous solution for electrochemical synthesis of polypyrrole part 1B: On copper and its alloys," Electrochimica Acta, vol. 52, pp. 1-14 (2007).
Bewley et al., "Intersheet Eddy-Current Loss in Laminated Cores," Electrical Engineering, pp. 344-346 (Mar. 1937).
Non-Final Office Action for U.S. Appl. No. 16/304,115 (May 11, 2023).
Advisory Action for U.S. Appl. No. 16/304,115 (Apr. 5, 2023).
Chinese Office Action for CN 201980086236.2 dated Oct. 9, 2022.
Final Office Action for U.S. Appl. No. 16/304,115 (Oct. 2, 2023).
Notification of Transmittal of the International Search Report and the Written Opinion of the International Searching Authority, or the Declaration of International Application No. PCT/US19/58288 (Jan. 14, 2020).
Restriction Requirement for U.S. Appl. No. 16/304,115 (Mar. 25, 2022).
Office Action for European Patent Application Serial No. 17803599.4 (Dec. 19, 2021).
Communication of the extended European search report for European Patent Application Serial No. 19875717.1 (Jul. 15, 2022).
Non-Final Office Action for U.S. Appl. No. 16/304,115 (Jul. 7, 2022).
Decision to Grant for European Patent Application Serial No. 17803599.4 (Sep. 26, 2024).
Kim, et al., "Interlamination Insulation Design Considerations For Laminated Magnetics Operating At High Frequencies", IEEE, pp. 1-10 (2015).
Notice of Allowance for U.S. Appl. No. 18/670,518 (Mar. 18, 2025).

* cited by examiner

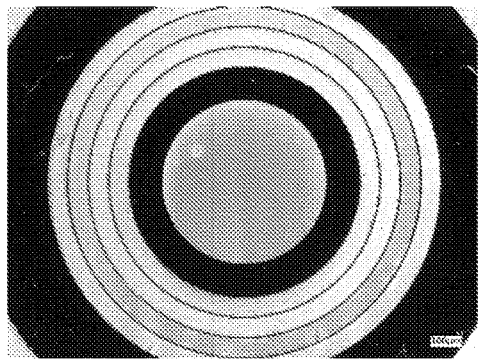
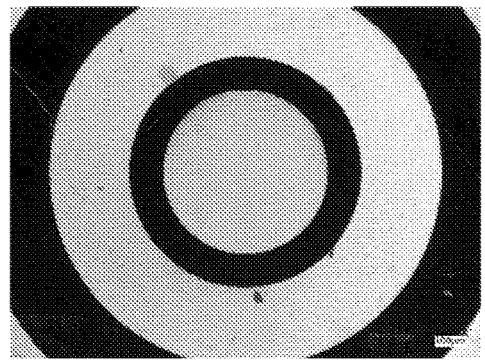
FIG. 4A                                      FIG. 4B
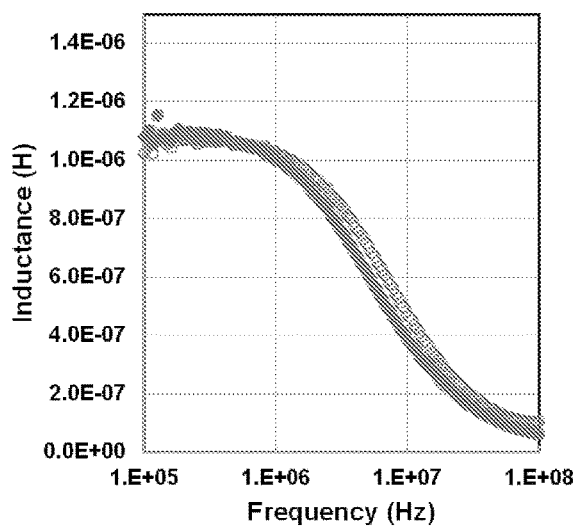
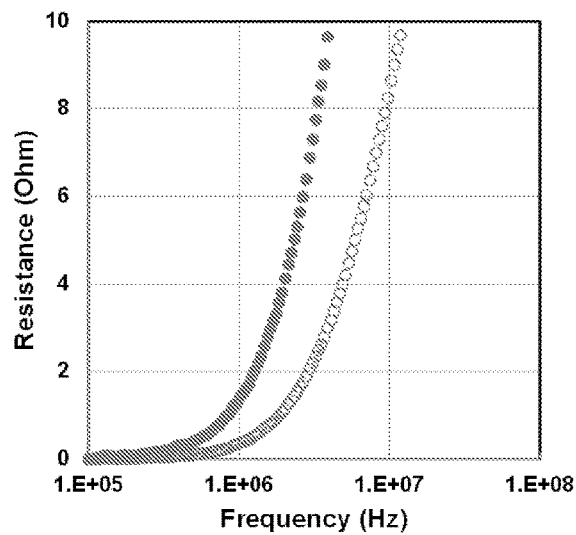
FIG. 4C                                      FIG. 4D

PATTERNED MAGNETIC CORES

PRIORITY CLAIM

This application claims the benefit of U.S. Provisional Patent Application Ser. No. 62/751,242, filed Oct. 26, 2018, the disclosure of which is incorporated herein by reference in its entirety.

TECHNICAL FIELD

The subject matter described herein relates generally to laminated magnetic cores. More particularly, the subject matter described herein relates to patterned magnetic cores, methods of fabricating patterned magnetic cores, and electric devices using patterned magnetic cores.

BACKGROUND

In general, electrically conducting magnetic materials exhibit superior magnetic properties compared to their non-electrical conducting counterparts; however, substantial eddy current losses at high operating frequencies (e.g., the typical 0.1-10 MHz frequencies used in DC-DC converters, battery chargers, and handheld devices, and higher frequencies (10-100 MHz) that may be utilized in future power systems-on-chip (PwrSOC) with integrated magnetics) where the skin depths of the materials are smaller than the thickness of the magnetic material limit the use of these materials. By creating stacks of micron or sub-micron thick layers of thin magnetic alloy sheets ('laminations') with interlamination layers of extremely low conductivity, the eddy current losses within the volume of the laminated alloys can be suppressed even at MHz frequencies; such conventionally insulated laminations are ideal for the realization of magnetic materials for high operating frequencies.

Since the interlayer insulation material used in some lamination techniques has nonzero conductivity, the changing profiles of eddy currents, which are enabled by leakage of current through the interlayer insulation, can result in delocalized eddy current losses. In view of these issues, there exists a need for suppressing delocalized eddy current losses of such laminated cores to a desired level (e.g., negligible compared to the intralayer eddy current losses), at a desired operating frequency.

SUMMARY

This document describes patterned magnetic core structures that include a desired number of properly electrically isolated sub-cores with desired individual sub-core widths and methods of fabricating patterned magnetic core structures. In some examples, a patterned magnetic core includes a first sub-core and at least one second sub-core. The first and second sub-cores are spaced apart by a gap, optionally filled with material of sufficiently low electrical conductivity. In some examples, the gap material comprises an electrically insulating material such as air, epoxy, potting materials, and inorganic materials (e.g., oxides and nitrides). In some examples, the gap comprises a partially conducting material such as semiconducting polymers. Each of the first and second sub-cores includes a number of magnetic layers and a number of interlamination layers disposed between the magnetic layers in an alternating fashion.

BRIEF DESCRIPTION OF THE DRAWINGS

FIG. 4A shows a patterned core;
FIG. 4B shows an unpatterned core;
FIG. 4C shows a plot of the inductance of the cores as a function of operating frequency;
FIG. 4D shows a plot of the resistance of the cores as a function of operating frequency.

DETAILED DESCRIPTION

Electrically conducting soft magnetic metallic alloys exhibit superior magnetic properties (e.g., higher saturation flux densities and lower coercivities) compared to their non-conducting counterparts such as ferrite materials. Ideally, operating thick, metallic cores at high frequencies (e.g., >3 MHz) will enable further miniaturization of inductors and transformers in many applications (e.g., DC-DC converters). However, at such frequencies, the skin depths of the metallic materials are typically on the order of a few micrometers. Within a thick core, that is substantially thicker than the skin depth, the magnetic flux will be induced only within the "skin" of the material, while a large eddy current loss is generated through the volume of the material. This issue can be resolved in a laminated core.

Figure 1A:
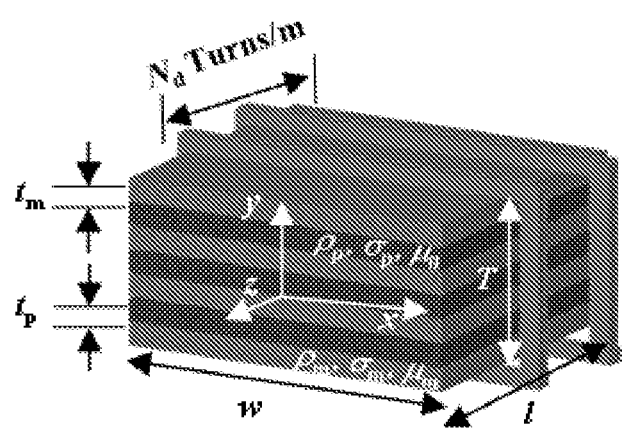
FIG. 1A shows an example of a laminated core.

FIG. 1A shows an example of a laminated core that includes thin, electrically insulated magnetic layers of which individual magnetic layers' (i.e., the insulation layers between the magnetic layers) thicknesses ($t_m$) are smaller than the skin depth of the magnetic material. The thicknesses of the individual interlamination insulation layers ($t_p$) are appropriately chosen such that the laminated core is compact. When the interlamination insulation is perfectly electrically insulating and the displacement currents are assumed to be negligible, the total eddy current loss of the core is the sum of the intralayer eddy current losses ($P_{e,i}$) generated within the individual magnetic layers.

Figure 1B:
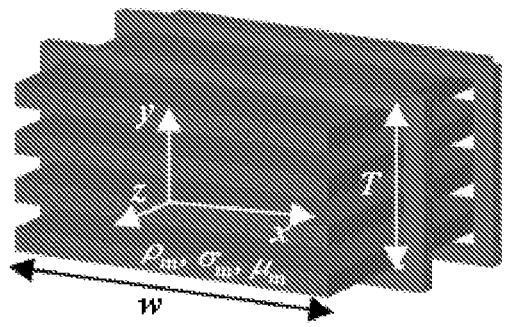
FIG. 1B illustrates a discrete layer model with reference to an example laminated core.

We refer to this theoretical model as the "discrete layer model." FIG. 1B illustrates the discrete layer model with reference to an example laminated core. A desired level of areal magnetic energy storage capacity can be achieved by stacking a proper number of magnetic layers, while these eddy current losses are completely suppressed to the level of hysteresis losses (i.e., the intrinsic losses due to the magnetization of the core).

The realization of such perfectly insulated laminated cores with microscale individual layer thicknesses is not trivial. Layer-by-layer, physical vapor deposition of magnetic and insulation materials has been utilized to achieve laminated cores with highly insulating interlamination; however, its slow deposition rate and high built-in stress (of the fabricated material) limits the achievable total laminated core thickness and manufacturability. Electrodeposition is a scalable approach to realize thick metallic magnetic materials; however, a continuous electrodeposition of alternating layers of metallic magnetic material and perfectly insulating material is not feasible, since the deposition occurs only on a conducting surface.

U.S. Patent Application No. 62/341,826, which was filed on May 26, 2016, presents a lamination approach based on an interlamination insulation material with an intermediate range of electrical conductivity, which combines the scalability of electrodeposition and the effective eddy current suppression within a laminated structure. U.S. Patent Application No. 62/341,826 is hereby incorporated by reference in its entirety. A continuous, sequential electrochemical deposition of alternating magnetic and interlamination layers, which is a scalable, manufacturable, and CMOS compatible approach to high frequency laminated cores, could be realized if the chosen interlamination material is sufficiently conductive to allow the electrochemical deposition of the magnetic material while also being sufficiently resistive to suppress the eddy current losses.

However, since the interlayer insulation material has nonzero conductivity, the changing profiles of eddy currents, which are enabled by leakage of current through the interlayer insulation, should be considered when designing the laminated core with such imperfect interlamination insulation; we refer to these cores with imperfect interlamination insulation as "leaky" cores. We assume that total eddy current loss generated from the leaky core ($P_e$) is a superposition of the intra-layer eddy current losses ($P_{e,i}$, calculated from the discrete layer model) and the "delocalized losses," $P_{e,d}$, which represent the losses generated from the eddy currents flowing among multiple magnetic layers.

This specification describes a core patterning approach that augments the previously-demonstrated core lamination technology by providing a route to suppress the delocalized eddy current losses of such leaky laminated cores to a desired level (e.g., negligible compared to the intralayer eddy current losses), at a desired operating frequency.

The cutoff frequency, $f_c$, i.e., the upper bound of the operating frequency (f) of the partially insulating laminated cores, can be defined as the frequency beyond which the total eddy current loss ($P_e$) of a core exceeds its material intrinsic hysteresis loss ($P_h$).

$$f < f_c$$

Figure 1C:
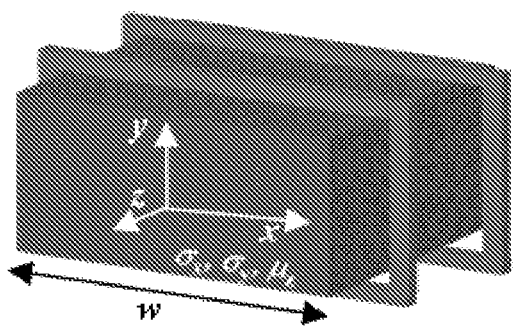
FIG. 1C illustrates a homogenized model.

Beyond this frequency, the total eddy current loss, $P_e$, which is typically a function of $f^{1.5}$-$f^2$, will dominate over the hysteresis loss, which is typically a function of $f$-$f^{1.5}$. The ratio of the total eddy current loss to the total hysteresis loss in a leaky laminated core (ETH) at the cutoff frequency can be calculated as:

$$ETH = \frac{P_e}{P_h} = \frac{P_{e,d} + P_{e,i}}{P_h} = \frac{\pi^2 \mu_m \sigma_m f_c}{12S}\left[\frac{w^2}{r_{mp}}\left(\frac{\gamma}{1-\gamma}\right) + t_m^2\right]$$

where $\sigma_m$ and $\mu_m$ are the conductivity, and permeability of the magnetic material, respectively, S is the shape factor of the hysteresis loop of the magnetic material, $r_{mp}$ is the ratio of the conductivity of the magnetic layer ($\sigma_m$) to the conductivity of the insulation layer ($\sigma_p$), i.e., $r_{mp} = \sigma_m/\sigma_p$, w is the width of the core, $t_m$ is the individual thickness of the magnetic layer, and $\gamma$ is the fill-factor, i.e., the volumetric portion of the magnetic material in the laminated core; the delocalized power loss ($P_{e,d}$) is calculated from a homogenized model where a laminated core is considered as an electrically anisotropic, homogeneous material with infinitesimally thin individual magnetic and interlamination layers (illustrated in FIG. 1C). We can choose a sufficiently small ETH as desired.

Note the first term of the equation corresponds to $P_{e,d}/P_h$ and the second term to $P_{e,i}/P_h$. When $P_{e,i}/P_h$ is fixed (i.e., fixed $t_m$) to an appropriate level, smaller w and/or higher $r_{mp}$ will further reduce the delocalized eddy current losses, and thus enable the operation of the core at a higher frequency (corresponding to higher $f_c$). Even if the material conductivity ratio $r_{mp}$ is fixed, the delocalized eddy currents can be suppressed to an acceptable level (e.g., $P_{e,d} = P_{e,i}$) when w is sufficiently small. Typically, the volume of a laminated core is defined by power handling constraints; hence, when we restrict the core width to satisfy a desired ratio of delocalized eddy current losses to intralayer eddy current losses ($P_{e,d}/P_{e,i}$), the total thickness of the core (T) needs to exceed a certain extent. Although thicker cores with smaller widths exhibit less delocalized eddy current losses compared to their counterparts (smaller total thicknesses and larger widths), the achievable total thickness of the core could be limited due to fabrication constraints.

Figure 2A:
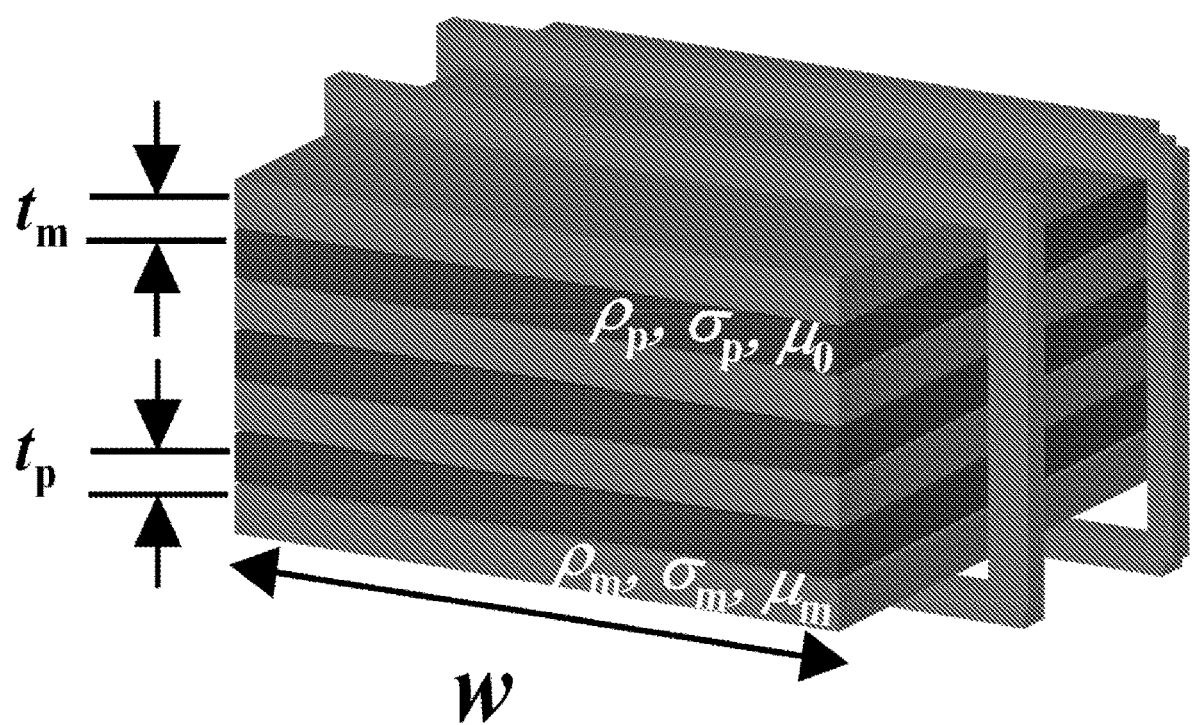
FIG. 2A shows an unpatterned magnetic core.
Figure 2B:
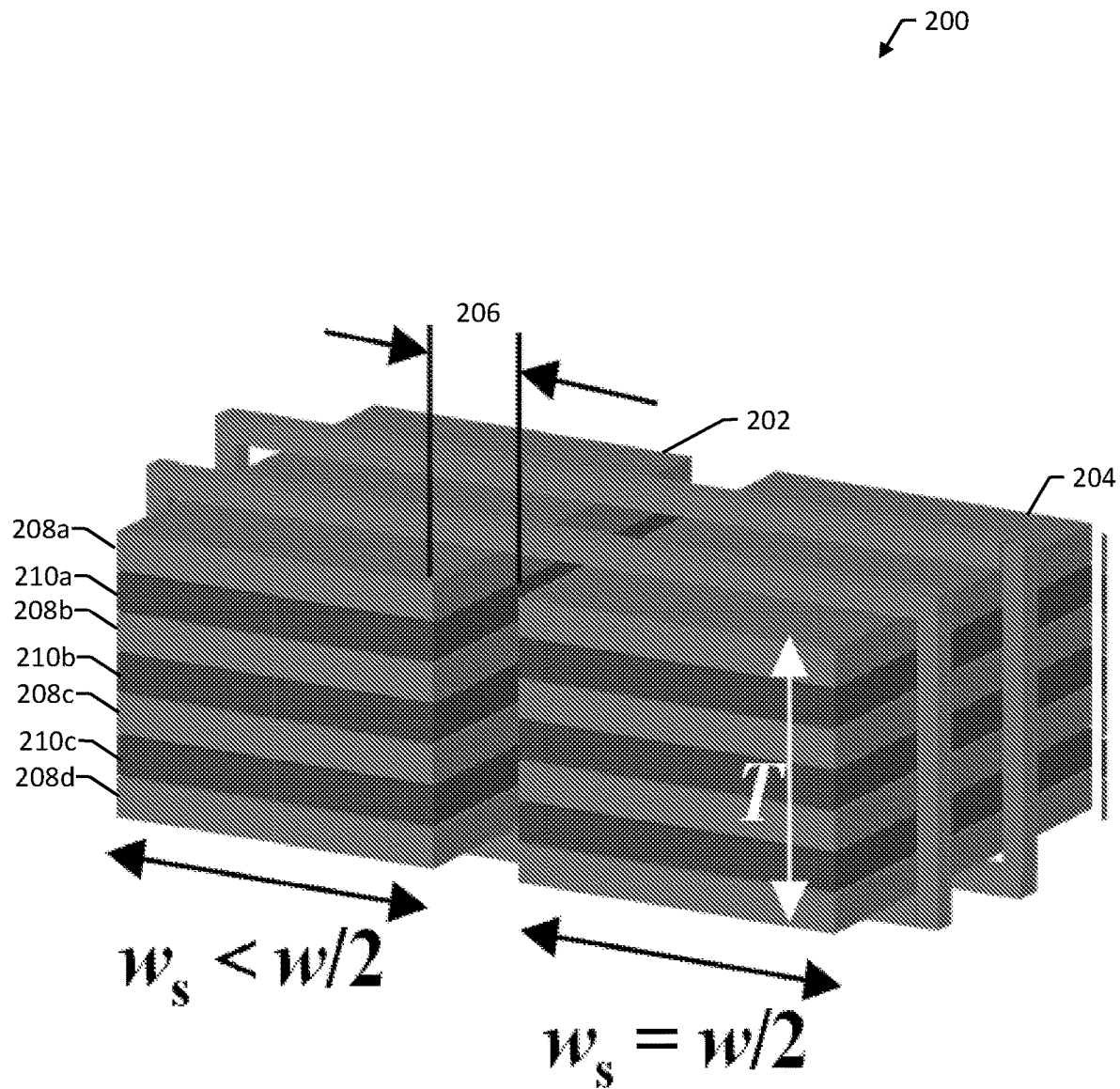
FIG. 2B shows a patterned magnetic core that comprises two sub-cores.

FIG. 2A shows an unpatterned magnetic core. FIG. 2B shows a patterned magnetic core 200 that comprises two sub-cores, a first sub-core 202 and a second sub-core 204. The first and second sub-cores 202 and 204 are spaced apart by a gap 206. The patterned magnetic core 200 can include a structure for holding the two sub-cores in place while maintaining the gap 206 at a specified distance.

Each of the first and second sub-cores 202 and 204 includes magnetic layers and interlamination layers disposed between the magnetic layers in an alternating fashion. For example, the first sub-core 202 includes magnetic layers 208*a-d* and interlamination layers 210*a-c*. The magnetic and interlamination layers can be, e.g., planar in shape, and the first and second sub-cores 202 and 204 can be oriented such that layers from the first sub-core 202 are generally coplanar with corresponding layers from the second sub-core 204.

In general, a patterned magnetic core includes a number (n) of electrically isolated subcores of which individual widths (i.e., subcore widths, $w_s$) are w/n as depicted in FIG. 2B. If the gap between the subcores is designed such that the subcores are electrically isolated while the decrease of the fill-factor due to the presence of the gap is minimized, the patterned laminated core may possess a large total width with suppressed delocalized eddy current losses within the individual subcores.

We can quantify how effectively delocalized eddy currents are suppressed within a patterned laminated core with n number (n>1) of w/n-wide subcores (i.e., $w_s$=w/n), by comparing its $P_{e,d}/P_{e,i}$ to that of an unpatterned laminated core with a core width of w. The total thicknesses (T) and fill factors ($\gamma$) of both cores were assumed to be identical; this would true if the total widths of the gaps between the subcores are negligible to w. The loss ratio of $P_{e,d}$ to $P_{e,i}$ of the unpatterned core is:

$$\left(\frac{P_{e,d}}{P_{e,i}}\right)_{unpatterned} = \frac{w^2}{t_m^2 r_{mp}}\left(\frac{\gamma}{1-\gamma}\right) = \left(\frac{w}{w_c}\right)^2$$

when the critical width ($w_c$) is:

$$w_c = t_m \sqrt{\frac{r_{mp}(1-\gamma)}{\gamma}}.$$

The loss ratio $P_{e,d}/P_{e,i}$ of the patterned core, which comprises n subcores, is $$\left(\frac{P_{e,d}}{P_{e,i}}\right)_{patterned} = \frac{n \cdot \left(\frac{w}{n}\right)^2}{w_c^2} = \left(\frac{1}{n}\right)\left(\frac{w}{w_c}\right)^2 = \left(\frac{1}{n}\right)\left(\frac{P_{e,d}}{P_{e,i}}\right)_{unpatterned}.$$

Since the intralayer eddy current losses of both cores are assumed identical, this results in:

$$P_{e,d,patterned} = \left(\frac{1}{n}\right) P_{e,d,unpatterned}$$

which validates the effective delocalized eddy current suppression within the patterned laminated core.

An appropriate example of subcore width would be $w_s=w_c$, where $P_{e,d}$ is suppressed to the level of $P_{e,i}$; further suppression of (delocalized) eddy currents can be attempted based on the patterned cores with smaller subcore widths ($w_s<w_c$). In general, the subcore widths, or in other words, the number of the subcores, will be appropriately defined by considering (1) the desired level of delocalized eddy current loss suppression, (2) fill factor loss due to the presence of the gaps, and (3) fabrication constraints (e.g., minimum achievable gap spacing through a particular core patterning approach). The orientation of the gap should be, in general, aligned with the flux paths; however, the geometry of the gap can be manipulated as long as the increase of the (magnetic) reluctance due to the manipulation is tolerable.

It should be also noticed that the gap between the subcores could comprise various materials as long as neighboring subcores are sufficiently electrically insulated from each other. The subcores are electrically-isolated if they are separated by air. The gaps could also be partially, or completely filled with both conventional insulation fillers (e.g., air, silicone, epoxy, inorganic fillers such as oxides and nitrides) and/or weakly conducting fillers (e.g., semiconducting conductive polymers). In some cases, the individual subcores may be partially connected by small lamination segments. The use of these partially conductive fillers and the partial connections are tolerable within the laminated cores as long as the suppression of the interlayer eddy current losses is achieved (to a desired level). These connections may be preferred in order to improve the mechanical integrity of the segmented core.

Figure 2C:
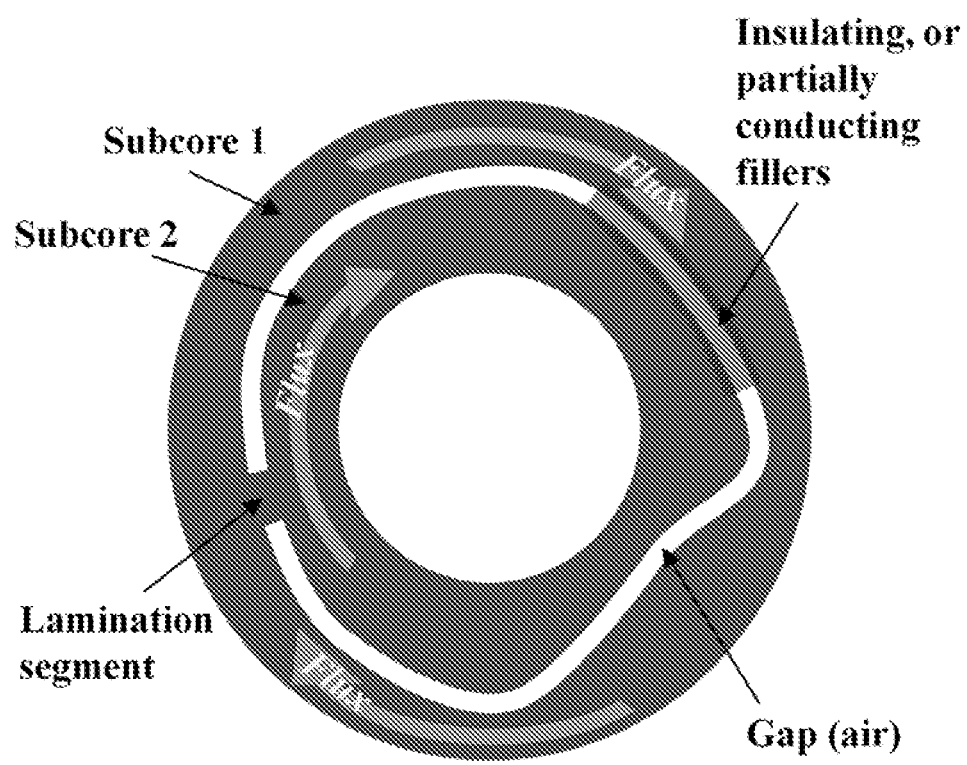
FIG. 2C shows an example of a gap within a toroidal laminated core.

FIG. 2C shows an example of a gap within a toroidal laminated core. The gap is patterned between two sub-cores. The gap may comprise air, insulating or partially insulating conductive fillers, and/or a small lamination segment. The gap, as illustrated in FIG. 2C, is patterned such that it is aligned with the induced magnetic flux.

Figure 3A:
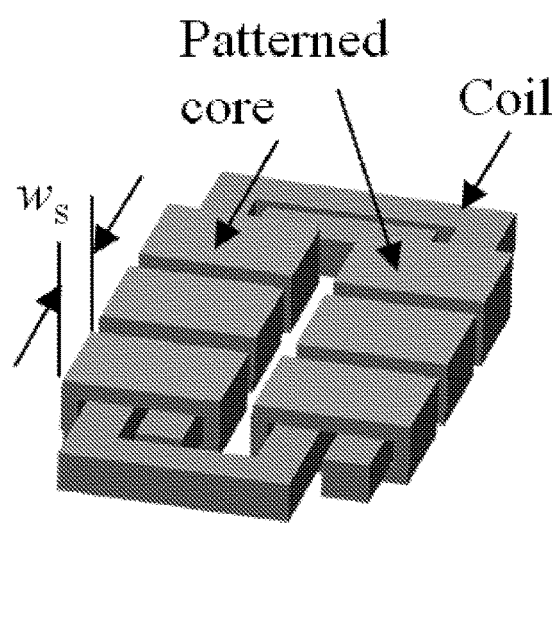
FIG. 3A is a schematic diagram of a racetrack inductor.
Figure 3B:
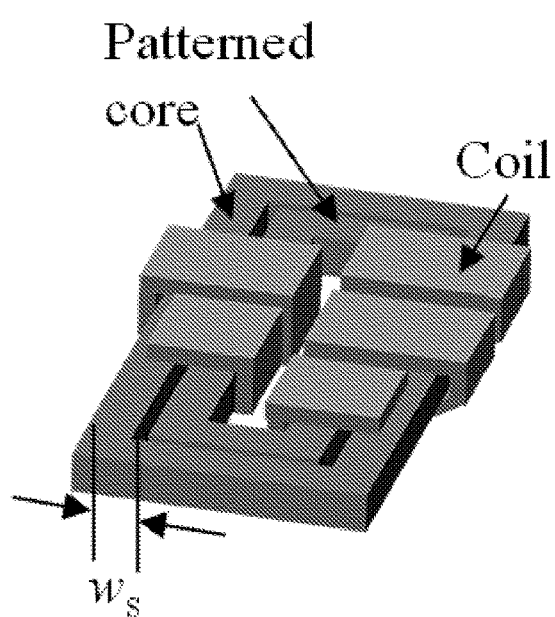
FIG. 3B is a schematic diagram of a toroidal inductor.

These patterned core designs are compatible with various inductor structures, e.g., toroidal and racetrack, as shown in FIGS. 3A and 3B. FIG. 3A is a schematic diagram of a racetrack inductor having a patterned magnetic core wrapped around a planar coil. FIG. 3B is a schematic diagram of a toroidal inductor having a coil wrapped around a patterned core. The cores are patterned such that the gap between the subcores are aligned with the flux paths.

Patterned laminated cores can be realized along with the creation of magnetic and interlamination materials (i.e., in-situ core patterning) or using post lamination process (i.e., post lamination patterning, such as laser machining, mechanical cutting/dicing, or sequential plasma etching/wet etching of metal and insulating material). An example of the in-situ core patterning approach is the continuous, through-mold electrochemical deposition described in U.S. Patent Application No. 62/341,826.

After an electrically insulating mold with an appropriate geometry is defined on an electrically conducting seed layer (e.g., metals such as copper, gold, silver, zinc, nickel and iron, transition metal oxides, transparent oxides, intrinsically conducting polymers, and carbon derivatives such as graphite and graphenes), an alternating, sequential deposition of metallic magnetic materials and partially conducting interlamination materials (e.g., conductive polymers such as polypyrrole) follows as desired. Since both electrochemical deposition reactions are selective to the conducting seed layers, the growths of the materials are guided by the mold. Through this patterning approach, the core geometry, including the gaps, and the core deposition are simultaneously achieved; in other words, no additional effort is necessary to pattern the core post-deposition. FIGS. 4A-4B show microscope pictures of example magnetic cores. FIG. 4A shows a patterned core and FIG. 4B shows an unpatterned core. FIG. 4C shows a plot of the inductance of the cores as a function of operating frequency, and FIG. 4D shows a plot of the resistance of the cores as a function of operating frequency FIGS. 4A and 4B show the optical microscope picture of an electrodeposited $Ni_{80}Fe_{20}$ (4 µm, 3 layers)/polypyrrole (0.33 µm, 2 layers) patterned core with 4 subcores and an unpatterned core as a control (same layer thicknesses, but without any gaps), respectively. Post sequential electrodeposition, the samples are detached from the substrates and the seed layers are selectively removed from the backside of the samples. Then, these cores are packaged within laser machined bobbins, along which 36 turns of magnet wires are wound.

The inductances ($L_{tot}$) and resistances ($R_{tot}$) of the fabricated inductors are measured as a function of operating frequency. From the total inductance/resistance measurements, the measured inductances and the resistances of the air-core inductors (i.e., the inductors with same winding geometries without any magnetic cores) are subtracted to calculate the contribution from the laminated cores (i.e., $L_{core}$ and $R_{core}$).

Note the difference between the volumes of the cores is almost negligible mainly because the total width of the gap between the patterned gaps is sufficiently small. Compared to the unpatterned core, the patterned core exhibits higher $L_{core}$ and smaller $R_{core}$ at least a factor of 2 at 1 MHz. Since the thicknesses of the individual layers are nominally identical, the high frequency performance improvement is the result of the (delocalized) eddy currents being suppressed in the patterned core.

The patterned core approach described in this specification can be extrapolated to any magnetic cores with anisotropic electrical conductivities, e.g., iron powder cores with platelet-type, thin and elongated, magnetic fillers, as long as the material composition of the core is sufficiently homogeneous. Similar to the laminated structures, the corresponding delocalized losses within such material systems (resulting from the eddy currents flowing across multiple, overlapped individual magnetic fillers) could be significantly reduced, achieving a higher magnetic energy storage efficiency at high frequencies.

Note the orientation of the patterned gaps (between individual subcores) will likely be, in general, aligned with the magnetic flux paths within the subcores so as not to add significant magnetic reluctance. Other well-known gap structures, e.g., gaps that are patterned orthogonal to the flux paths to improve the uniformity of magnetic fluxes, or to lower the (effective) permeability of a magnetic core, can be also employed within the present patterned laminated cores. An appropriate use of these gaps will enable a scalable, manufacturable, CMOS compatible core lamination technology that is capable of achieving desired magnetic properties and suppressed (eddy current) losses, at high operating frequencies.

Figure 5A:
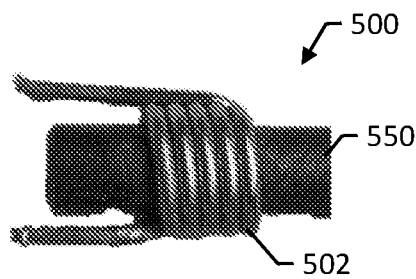
FIGS. 5A-C illustrate example electric devices that can use the laminated magnetic core.
Figure 5B:
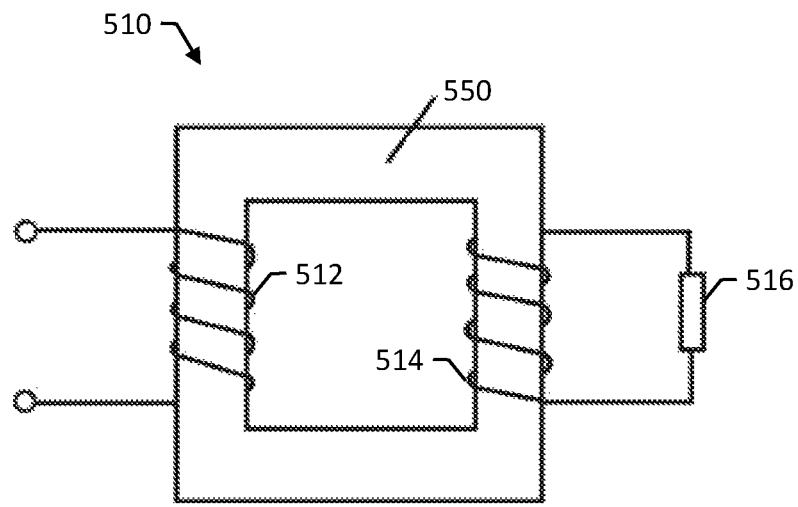
Figure 5C:
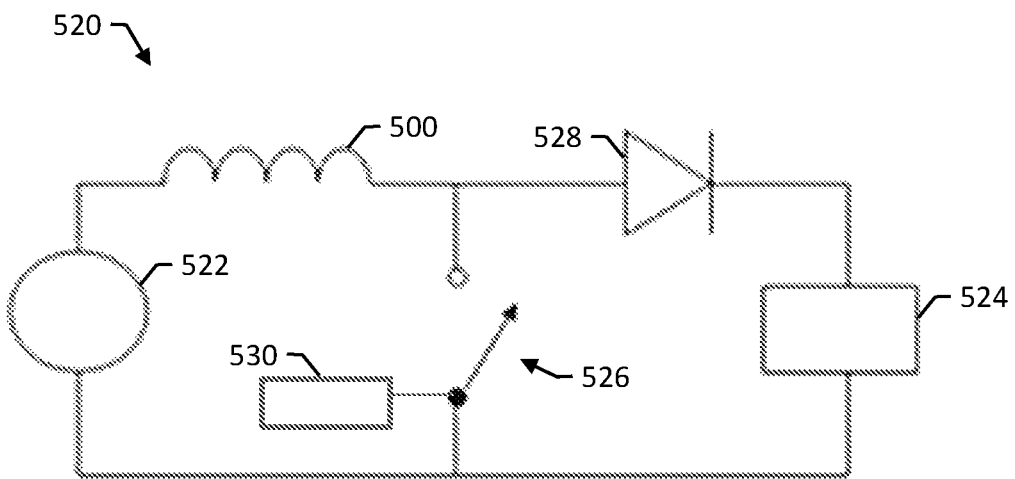

FIGS. 5A-C illustrate example electric devices that can use a patterned magnetic core as described above. Various electric devices can use the patterned magnetic core and the illustrated devices are presented for purposes of illustration.

FIG. 5A shows an example inductor 500 that includes a patterned magnetic core 550 and a wire 502 coiled around patterned magnetic core 550. Inductors can be made of various sizes and shapes to fit particular applications.

FIG. 5B shows an example transformer 510 that includes a patterned magnetic core 550. In this example, the patterned magnetic core 550 has been fabricated as a rectangle with a rectangular hole to permit wrapping a primary winding 512 and a secondary winding 514 about patterned magnetic core 550. The transformer 510 transfers electrical energy from an input coupled to the primary winding 512 to a load 516 coupled to the secondary winding 514.

FIG. 5C shows an example switched-mode power converter 520. The switched-mode power converter 520 is coupled at an input to an electrical source 522, and the switched-mode power converter 520 is configured to convert power from the source 522 to a load 524 coupled at an output. The switched-mode power converter 520 includes a switch 526 and an inductor 500 coupled between the input and the switch 526.

The switched-mode power converter 520 also includes a switch controller 530 configured to modulate the switch 526 at a frequency exceeding 0.1 MHz (for example, at a frequency in the range between 0.1 MHz and 10 MHz, or up to higher frequencies such as 40 MHz and, in some examples, up to 100 MHz). The switch controller 530 can be configured to operate switched-mode power converter 520 as a DC-DC converter and to regulate an output voltage to load 524.

Other example applications of patterned magnetic cores include:

1. High power (1-10 W) operation power converters based on the inductors and transformers.
2. Batch-fabricated, microinductors (e.g. inductors with co-fabricated microcoil and laminated cores) to realize multiphase power conversion topology that uses a number of parallel power stages to drive a single load.
3. Compact, miniaturized power conversion systems (e.g., switched-based DC-DC power converters) based on a proper integration of the microinductors (with the patterned cores) and control circuits.

Accordingly, while the methods, systems, and computer readable media have been described herein in reference to specific embodiments, features, and illustrative embodiments, it will be appreciated that the utility of the subject matter is not thus limited, but rather extends to and encompasses numerous other variations, modifications and alternative embodiments, as will suggest themselves to those of ordinary skill in the field of the present subject matter, based on the disclosure herein.

Various combinations and sub-combinations of the structures and features described herein are contemplated and will be apparent to a skilled person having knowledge of this disclosure. Any of the various features and elements as disclosed herein may be combined with one or more other disclosed features and elements unless indicated to the contrary herein. Correspondingly, the subject matter as hereinafter claimed is intended to be broadly construed and interpreted, as including all such variations, modifications and alternative embodiments, within its scope and including equivalents of the claims.

It is understood that various details of the presently disclosed subject matter may be changed without departing from the scope of the presently disclosed subject matter. Furthermore, the foregoing description is for the purpose of illustration only, and not for the purpose of limitation.

What is claimed is:

1. A patterned magnetic core comprising:
a first sub-core; and
at least one second sub-core, wherein the first and second sub-cores are spaced apart by a gap, wherein each of the first and second sub-cores has a width less than or equal to a threshold width based on an operating frequency of the patterned magnetic core and wherein each of the first and second sub-cores comprises:
a plurality of magnetic layers; and
a plurality of interlamination layers disposed between the magnetic layers in an alternating fashion.

2. The patterned magnetic core of claim 1, wherein the threshold width is based on a thickness of the magnetic layers, a ratio between a conductivity of the magnetic layers and a conductivity of the interlamination layers, and a fill-factor characterizing a volumetric portion of the magnetic layers within each sub-core.

3. The patterned magnetic core of claim 1, wherein a width of the gap is substantially less than a width of the first and second sub-cores.

4. The patterned magnetic core of claim 1, wherein the gap comprises an electrically insulating material.

5. The patterned magnetic core of claim 1, wherein the interlamination layers comprise a partially conducting material having a conductivity greater than or equal to $10^{-4}$ S/cm and less than or equal to 105 S/cm.

6. The patterned magnetic core of claim 1, wherein the magnetic layers each have a thickness less than or equal to 10 μm and greater than or equal to 0.1 um.

7. The patterned magnetic core of claim 1, wherein the interlamination layers each have a thickness less than or equal to 1 μm and greater than or equal to 0.1 um.

8. A patterned magnetic core comprising:
a first sub-core; and
at least one second sub-core, wherein the first and second sub-cores are spaced apart by a gap, wherein the gap comprises a partially conducting material and wherein each of the first and second sub-cores comprises:
a plurality of magnetic layers; and
a plurality of interlamination layers disposed between the magnetic layers in an alternating fashion.

9. The patterned magnetic core of claim 8, wherein the magnetic layers comprise a magnetic alloy, and wherein the partially conducting material is a conductive polymer.

* * * * *